(12) United States Patent
Forsman et al.

(10) Patent No.: US 6,742,139 B1
(45) Date of Patent: May 25, 2004

(54) SERVICE PROCESSOR RESET/RELOAD

(75) Inventors: Stephanie Maria Forsman, Rochester, MN (US); Brent William Jacobs, Rochester, MN (US); Kevin Gene Kehne, Austin, TX (US); Paul Edward Movall, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 589 days.

(21) Appl. No.: 09/692,339

(22) Filed: Oct. 19, 2000

(51) Int. Cl.[7] ............................................. G06F 11/20
(52) U.S. Cl. ............................ 714/23; 714/9; 714/30
(58) Field of Search ............................. 714/9, 23, 30

(56) References Cited

U.S. PATENT DOCUMENTS

| | | | | |
|---|---|---|---|---|
| 4,894,828 A | * | 1/1990 | Novy et al. | 714/11 |
| 5,390,323 A | * | 2/1995 | Newell et al. | 714/45 |
| 5,774,642 A | * | 6/1998 | Flon et al. | 714/13 |
| 5,808,886 A | * | 9/1998 | Suzuki | 700/4 |

* cited by examiner

*Primary Examiner*—Scott Baderman
*Assistant Examiner*—Anne L. Damiano
(74) *Attorney, Agent, or Firm*—Duke W. Yee; Mark E. McBurney; Wayne P. Bailey

(57) ABSTRACT

A method, system, and apparatus for reestablishing communications between a host and a service processor after the service processor has ceased to function correctly is provided. In one embodiment, the host exchanges heartbeat signals with the service processor. The heartbeat signals indicate that the service processor is active and functioning. In response to a failure to receive a heartbeat signal or in response to some other indication that the service processor is not performing correctly, the host causes a hard reset of the service processor. In addition, the service processor can detect a failure within itself and initiate a hard reset to itself. After the hard reset, the service processor returns to a monitoring mode without performing initial tests of the data processing system. Furthermore, the data processing system remains active and is not shut down during the hard reset of the service processor.

30 Claims, 3 Drawing Sheets

SERVICE PROCESSOR RESET/RELOAD

BACKGROUND OF THE INVENTION

1. Technical Field

The present invention relates generally to the field of computer architecture and, more specifically, to methods and systems for resetting the service processor in a data processing system.

2. Description of Related Art

Some systems, such as the RS/6000, a product of the International Business Machines Corporation of Armonk, N.Y., offer a service processor that is a shared resource within the data processing system. The service processor provides vital monitoring to the operating system. However, in existing systems, if the host operating system experiences a communication failure with the service processor, there is no recovery mechanism for the host to recover communications with the service processor. Thus, the host operating system must choose between either continuing to operate without vital monitoring performed by the service processor or shutting down or terminating system operations. Neither of these options is very satisfying.

Therefore, it would be desirable to have a method, system, and apparatus for reestablish communications between the host operating system and the service processor in a manner that does not interfere with the operation of the host operating system.

SUMMARY OF THE INVENTION

The present invention provides a method, system, and apparatus for reestablishing communications between a host and a service processor after the service processor has ceased to function correctly. In one embodiment, the host exchanges heartbeat signals with the service processor. The heartbeat signals indicate that the service processor is active and functioning. In response to a failure to receive a heartbeat signal or in response to some other indication that the service processor is not performing correctly, the host causes a hard reset of the service processor. In addition, the service processor can detect a failure within itself and initiate a hard reset to itself. After the hard reset, the service processor returns to a monitoring mode without performing initial interrogation and testing of the data processing system. The interrogation and testing would be destructive to the running state of the system. Furthermore, the data processing system remains active and is not shut down during the hard reset of the service processor.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
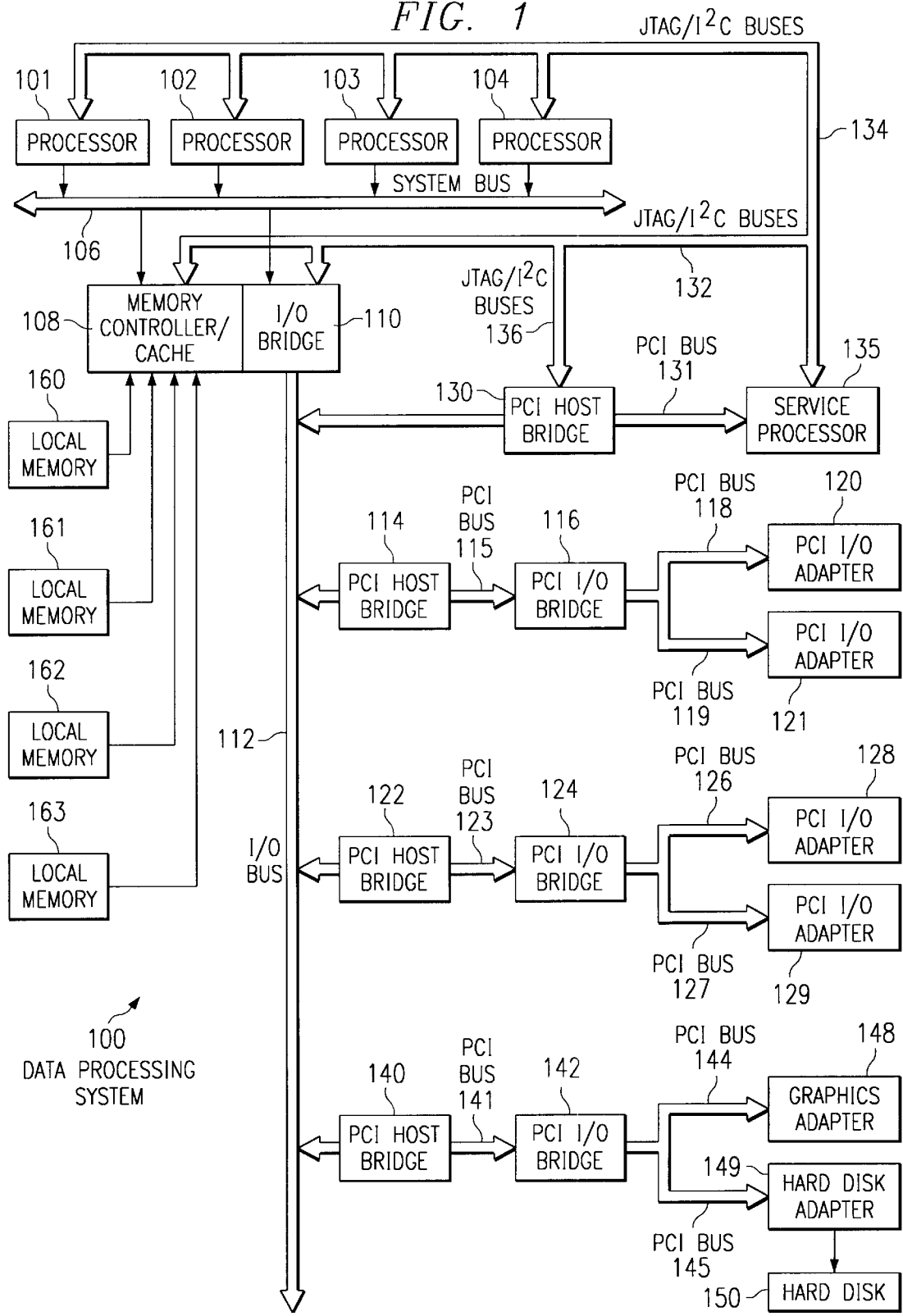
FIG. 1 depicts a block diagram of a data processing system in accordance with the present invention.

With reference now to the figures, and in particular with reference to FIG. 1, a block diagram of a data processing system in which the present invention may be implemented is depicted. Data processing system 100 may be a symmetric multiprocessor (SMP) system including a plurality of processors 101, 102, 103, and 104 connected to system bus 106. For example, data processing system 100 may be an IBM RS/6000, a product of International Business Machines Corporation in Armonk, N.Y., implemented as a server within a network. Alternatively, a single processor system may be employed. Also connected to system bus 106 is memory controller/cache 108, which provides an interface to a plurality of local memories 160–163. I/O bus bridge 110 is connected to system bus 106 and provides an interface to I/O bus 112. Memory controller/cache 108 and I/O bus bridge 110 may be integrated as depicted.

Peripheral component interconnect (PCI) Host bridge 114 connected to I/O bus 112 provides an interface to PCI local bus 115. A number of Input/Output adapters 120–121 may be connected to PCI bus 115. Typical PCI bus implementations will support between four and eight I/O adapters (i.e. expansion slots for add-in connectors). Each I/O Adapter 120–121 provides an interface between data processing system 100 and input/output devices such as, for example, other network computers, which are clients to data processing system 100.

An additional PCI host bridge 122 provide an interface for an additional PCI bus 123. PCI bus 123 is connected to a plurality of PCI I/O adapters 128–129 by a PCI bus 126–127. Thus, additional I/O devices, such as, for example, modems or network adapters may be supported through each of PCI I/O adapters 128–129. In this manner, data processing system 100 allows connections to multiple network computers.

A memory mapped graphics adapter 148 may be connected to I/O bus 112 through PCI Host Bridge 140 and PCI I/O bridge 142 via PCI buses 141 and 144 as depicted. Also, a hard disk 150 may also be connected to I/O bus 112 through PCI Host Bridge 140 and PCI I/O bridge 142 via PCI buses 141 and 145 as depicted. Hard disk 150 may be logically partitioned between various partitions without the need for additional hard disks. However, additional hard disks may be utilized if desired.

A PCI host bridge 130 provides an interface for a PCI bus 131 to connect to I/O bus 112. Service processor 135 is coupled to PCI Host Bridge 130 through PCI Bus 131. Service processors 135 is also connected to processors 101–104, Memory Controller 108, and I/O Bridges 110 and 130, via a plurality of JTAG/I²C buses 132, 134, and 136. JTAG/I²C buses 134 are a combination of JTAG/scan buses (see IEEE 1149.1) and Phillips I²C buses. However, alternatively, JTAG/I²C buses 132, 134, and 136, may be replaced by only Phillips I²C buses or only JTAG/scan buses.

When data processing system 100 is initially powered up, service processor 135 uses the JTAG/I²C buses 132, 134, and 136 to interrogate the system (Host) processors 101–104, memory controller 108, and I/O bridge 110. At completion of this step, service processor 135 has an inventory and topology understanding of data processing system 100. Service processor 135 also executes Built-In-Self-Tests (BISTs), Basic Assurance Tests (BATs), and memory tests on all elements found by interrogating the system processors 101–104, memory controller 108, and I/O bridge 110. Any error information for failures detected during the BISTs, BATs, and memory tests are gathered and reported by service processor 135 to an error log. Entries are communicated to the error log as they occur to the operating system.

If a meaningful/valid configuration of system resources is still possible after taking out the elements found to be faulty during the BISTs, BATs, and memory tests, then data processing system 100 is allowed to proceed to load executable code into local (Host) memories 160–163. Service processor 135 then releases the Host processors 101–104 for execution of the code loaded into Host memory 160–163. While the Host processors 101–104 are executing code from respective operating systems within the data processing system 100, service processor 135 enters a mode of monitoring and reporting errors. The type of items monitored by service processor include, for example, the cooling fan speed and as operation, thermal sensors, power supply regulators, and recoverable and non-recoverable errors reported by processors 101–104, memories 160–163, and bus-bridge controller 110.

Service processor 135 is responsible for saving and reporting error information related to all the monitored items in data processing system 100. Service processor 135 also takes action based on the type of errors and defined thresholds. For example, service processor 135 may take note of excessive recoverable errors on a processor's cache memory and decide that this is predictive of a hard failure. Based on this determination, service processor 135 may mark that resource for deconfiguration during the current running session and future Initial Program Loads (IPLs). IPLs are also sometimes referred to as a "boot" or "bootstrap".

If one of host processors 101–104 detects that service processor 135 is not functioning correctly, one of host processors 101–104 may perform a hard reset of service processor 135. Although, a hard reset is often performed by cycling the power (i.e. turning the power to a device off and on) to clear the internal settings of the device, in one embodiment of the present invention, the hard reset of service processor 135 is performed by logic circuits (not shown) which provide the equivalent reset state to service processor 135 as a full power cycle. This hard reset of service processor 135 is performed such that service processor 135 jumps back into the monitoring mode of operation without having the system perform an IPL again. Likewise, if service processor 135 detects a failure itself, it will perform the reset and return to monitoring mode of operation without having the system perform an IPL again and without performing destructive actions on the JTAG/I$^2$C buses. Thus, the use of the shared resources of the host is not disturbed and the destructive actions over the JTAG/I$^2$C buses 134 are not performed.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the present invention.

Figure 2:
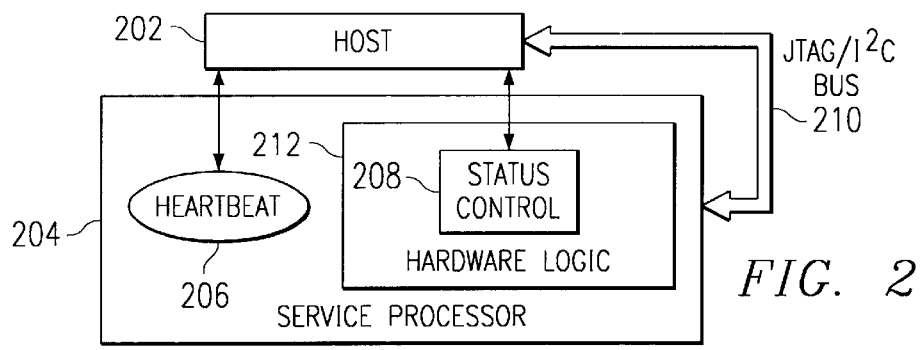
FIG. 2 depicts a block diagram illustrating a communication system between a service processor and a host system in accordance with the present invention.

With reference now to FIG. 2, a block diagram illustrating a communication system between a service processor and a host is depicted in accordance with the present invention. Communication system 200 includes a host 202, service processor 204, and JTAG/I$^2$C bus 210. Service processor 204 may be implemented, for example, as service processor 135 in FIG. 1. Host 202 is a processor/memory complex on which an operating system and user applications are run. For example, host 202 may be implemented using processor 101 and local memory 160 in FIG. 1. JTAG/I$^2$C bus 210 may be implemented as JTAG/I$^2$C bus 134 in FIG. 1.

In proper running state, service processor 204 monitors system operations over JTAG/I$^2$C buses 210. Host 202 and service processor 204 also exchange heartbeat signals 206, which are services provided within service processor 204. In prior art systems, if host 202 detected a loss of heartbeat signals 206 from service processor 204 indicating that service processor 204 was not functioning correctly, or the service processor itself detects that it has failed, the only recovery action was to take the entire data processing system down. User operations are thus interrupted. However, by taking down the entire data processing system, the opportunity to perform a hard reset of the service processor 204 and then have the data processing system IPL was provided. By having the system IPL, the service processor could use the JTAG/I$^2$C buses 210 to gather configuration information, initialize, test, and then monitor system operations.

In the present invention, when host 202 fails to detect a heartbeat signal 206 from service processor 204, the entire data processing system is not powered down. Instead, host 202, or service processor 204, attempts to recover full operations of service processor 204 by initiating a hard reset of the service processor in which the service processor jumps back into the monitoring mode of operation without using JTAG/I$^2$C buses 210 to gather configuration and/or test results. Furthermore, such hard reset of service processor 204 is performed in a way that does not disturb host 202 usage of shared resources.

In instances where the service host 202 initiates the communications recovery with service processor 204, host 202 checks the status portion of status/control register 208 in hardware logic 212 to determine if conditions exist that preempt host 202 from resetting service processor 204. A few of examples of this type of status are when service processor 204 is in a special debug mode used by developers, when service processor 204 is in the process of handling a critical event, and when service processor 204 is attempting to recover from a self detected error.

If no status exceptions are found, then host 202 proceeds to set a bit in the control portion of status/control register 208 to cause a non-maskable interrupt to service processor 204 indicating that a hard reset of service processor 204 is about to commence. This provides a warning to service processor 204 and allows service processor 204, if possible, to place itself in a better state for being reset. If an acknowledgement is received from service processor 204 indicating that it is ready to be reset or if a timeout occurs waiting for the acknowledgement, then host 202 sets a different bit in the control portion of status/control register 208 that causes a hard reset of service processor 204. Host 202 allows a predefined grace period prior to expecting to see service processor 204 resume exchanging heartbeat signals 206 and updating of the status register within status/control register 208. The testing performed by the service processor 204 during IPL are not performed after the service processor 204 is reset by the host 202 in accordance with the present invention since such tests would be destructive to the running state of the host 202.

Figure 3:
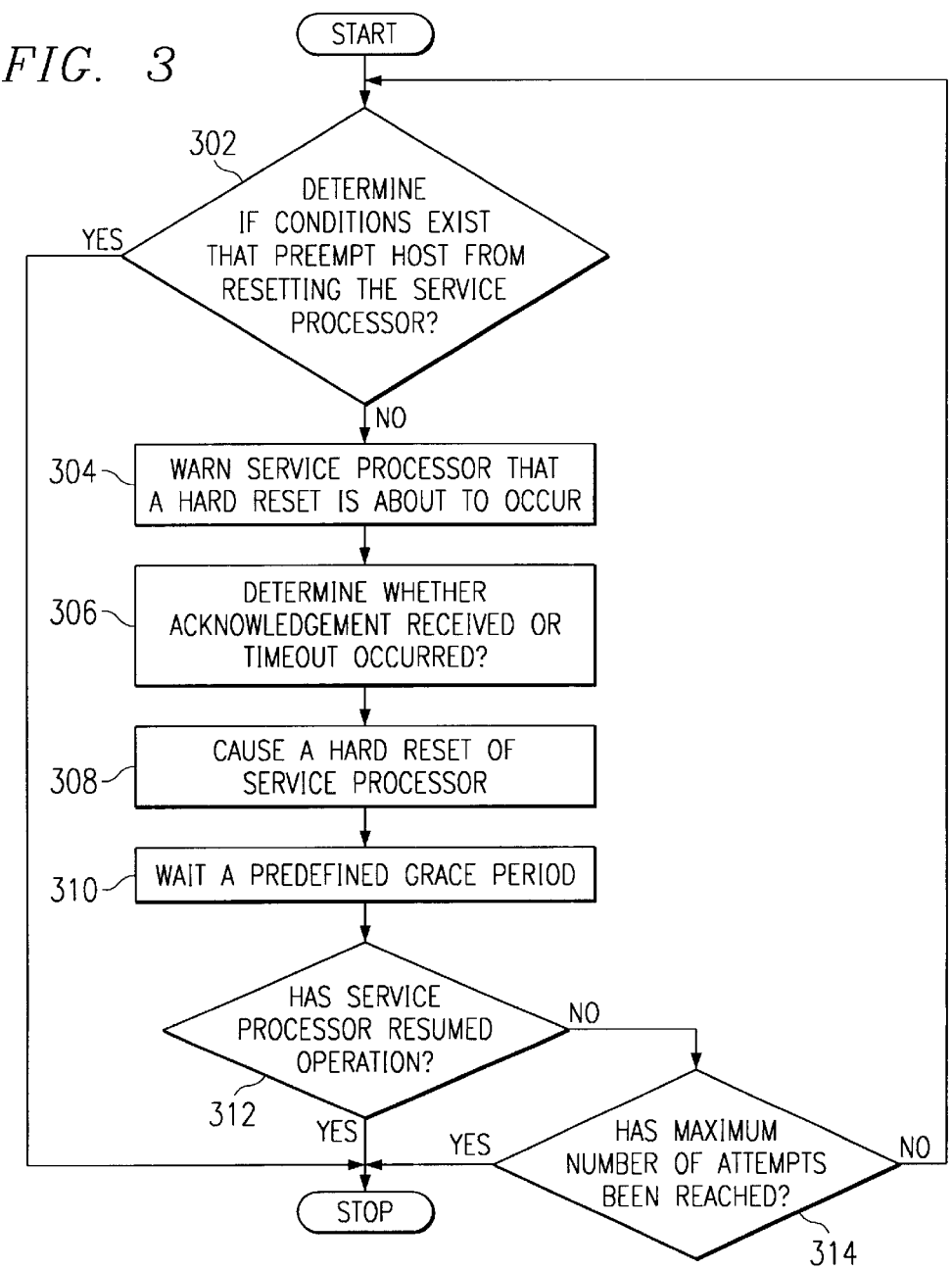
FIG. 3 depicts a flowchart illustrating an exemplary process for recovering communications by a host with a service processor in accordance with the present invention.

With reference now to FIG. 3, a flowchart illustrating an exemplary process for recovering communications by a host with a service processor is depicted in accordance with the present invention. If host, such as, for example, host 202 in FIG. 2, has lost communications with a service processor, such as, for example, service processor 204 in FIG. 2, the host determines if there are conditions such as discussed above that exist that preempt the host from resetting the service processor (step 302). If there are conditions that preempt the host from resetting the service processor, then the processor for reestablishing communications with the service processor ends. If there are no conditions that preempt the host from resetting the service processor, then the host sends a signal to the service processor warning the service processor that a hard reset is about to occur (step 304). Such a warning, as discussed above, allows the service processor to place itself in a better position for being reset.

The host then determines whether an acknowledgement has been received or a timeout has occurred (step 306). The acknowledgement indicates that the service processor has received the warning and is ready to be reset. The timeout period is a predefined interval of time that the host must wait for a response from the service processor before assuming that the service processor is not going to respond.

Once the acknowledgement has been received or the timeout period occurred, the host causes a hard reset of the service processor (step 308). In this hard reset, the service processor reenters the monitoring mode without performing any BISTs, BATs, memory tests, or other configuration tests on the host hardware. The host then waits a predefined grace period (step 310) to allow the service processor to resume operations and then determines whether a heartbeat signal or other indication of proper service processor activity has been received (step 312). If the host receives an indication that the service processor is performing properly, then the host continues with normal operations.

If no indication of proper service processor activity is received, then the host determines whether it has reached a maximum number of attempts to reestablish communications with the service processor (step 314). If the maximum number of attempts has been reached, then the host ceases its attempts to reestablish communications with the service processor assuming the service processor to have failed. The host may notify a system manager or other proper person of this condition so that the service processor may be replaced or otherwise serviced. If the maximum number of attempts have not been reached, then the host continues attempting to reestablish communications with the service processor beginning with step 302.

In instances where service processor 204 detects an error within service processor 204, it will recover itself and communications with host 202 after initiating a hard reset to service processor 204. This hard reset is performed after the service processor 204 has saved away data relating to the error and sets the status portion of status/control register 208 in hardware logic 212 indicating that service processor is attempting to recover from a self detected error.

When service processor 204 hardware comes out of the hard reset state, service processor 204 software determines if a maximum number of reset/reloads have been attempted within a predetermined time limit. If not, service processor 204 will increment its reset/reload count, and continue with the reinitialization itself, without interfering with host 202 operation. Once service processor 204 reinitialization is complete, service processor 204 clears the status portion of status/control register 208 in hardware logic 212, indicating that service processor has now recovered from a self detected error. Finally service processor 204 reports the data saved away earlier to host 202. The testing performed by the service processor 204 during IPL are not performed after the service processor 204 is reset by service processor 204 in accordance with the present invention since such tests would be destructive to the running state of the host 202.

Figure 4:
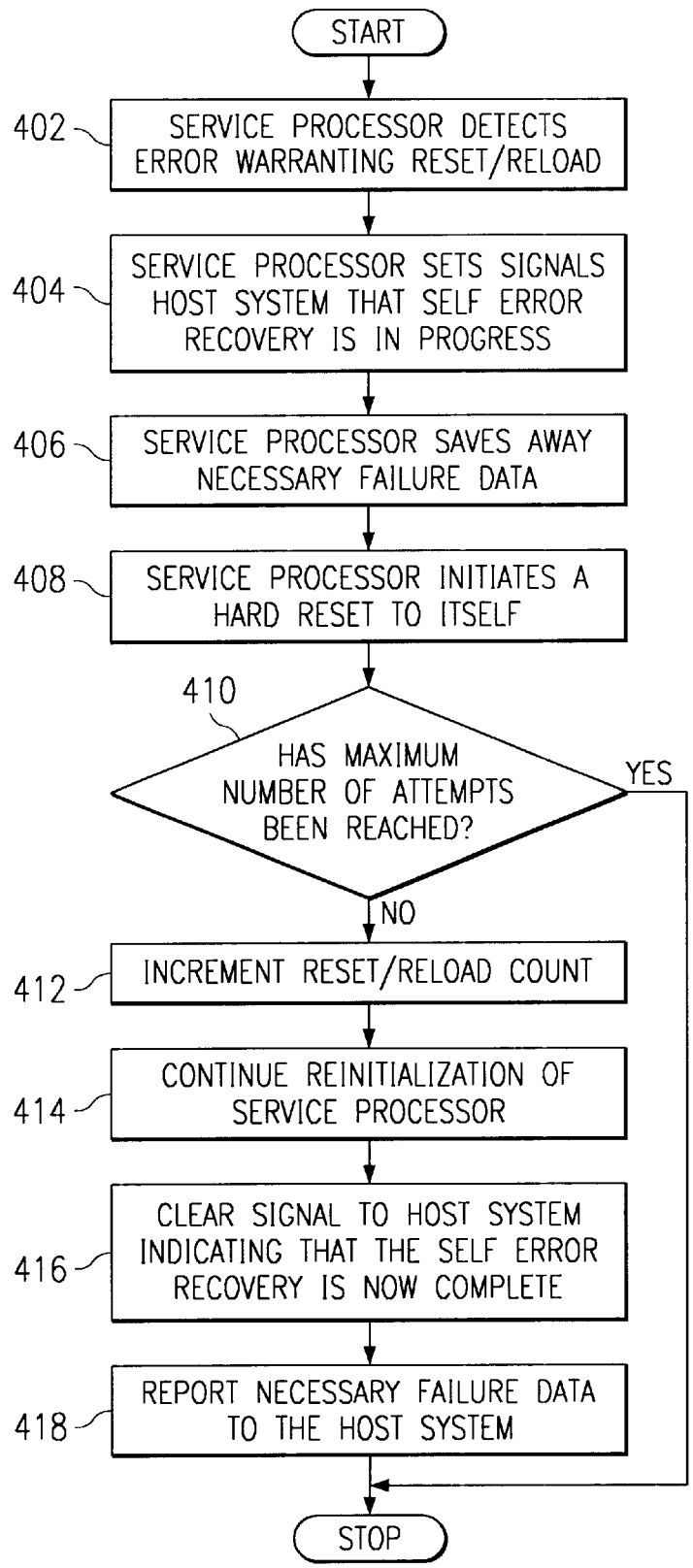
FIG. 4 depicts a flowchart illustrating an exemplary process for recovering communications between the host and service processor, when the service processor detects a failure within itself.

With reference now to FIG. 4, a flowchart illustrating an exemplary process for recovering service processor and communications with a host system is depicted in accordance with the present invention. Service processor, such as, for example, service processor 204 in FIG. 2, has detected a failure within itself which warrants a reset and reload of service processor (step 402). The service processor signals the host system that service processor is attempting to recover a self detected error (step 404). The service processor saves data relevant to the detected failure (step 406) and causes a hard reset to itself (step 408). Once the service processor hardware comes out of the hard reset state, the service processor software will determine if a maximum number of reset/reloads have been attempted within a predetermined amount of time (step 410).

If the maximum has been reached, then service processor will go no further in attempting to recover itself or communications with the host system. If the maximum number of reset/reload attempts has not been exceeded, then the service processor will increment its reset/reload count (step 412). Service processor will now continue with its reinitialization (step 414) without interfering with the operation of the host system. Once service processor has completed its reinitialization, it clears the signal to the host system that the service processor is attempting to recover a self detected error, indicating to the host that the service processor is capable of communications again (step 416). The service processor will now communicate any necessary failure data to the host system (step 418).

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for reestablishing communications between a host and a service processor, the method comprising:

initiating a monitoring mode to monitor the host by the service processor;

determining that the service processor is not performing correctly; and causing the service processor to reset such that the service processor returns to the monitoring mode to which it was operating prior to the reset without performing initial tests of a data processing system; wherein the data processing system remains active and is not shut down during the reset of the service processor.

2. The method as recited in claim 1, further comprising:
determining, prior to causing a reset of the service processor, whether a condition exists that preempt the host from causing a reset of the service processor; and
responsive to an indication that the condition exists, refraining from causing a hard reset of the service processor.

3. The method as recited in claim 2, wherein the step of determining whether a condition exists that preempts the host from causing a reset of the service processor comprises consulting a status register.

4. The method as recited in claim 1, wherein the step of causing a reset comprises changing a bit in a control register.

5. The method as recited in claim 1, further comprising:
sending a signal to the host system indicating that a self error recovery by the service processor is in progress.

6. The method as recited in claim 5, further comprising:
determining, prior to completing a self error recovery and recovering communications to the host system, whether the service processor has exceeded a predetermined maximum number of reset/reload attempts within a predetermined amount of time.

7. The method as recited in claim 6, further comprising:
incrementing a count, wherein the count indicates the number of times that the service processor has reset itself in a predetermined amount of time.

8. The method as recited in claim 5, further comprising:
clearing the signal to the host system indicating that the service processor self error recovery is complete.

9. A method for reestablishing communications between a host and a service processor, the method comprising:
determining that a service processor is not performing correctly;
causing the service processor to reset such that the service processor returns to a monitoring mode without performing initial tests of a data processing system, wherein the data processing system remains active and is not shut down during the reset of the service processor; and
sending a warning signal to the service processor, prior to causing a reset of the service processor, indicating that a reset will be attempted and waiting an interval of time between sending the warning signal and causing the reset.

10. A method for reestablishing communications between a host and a service processor, the method comprising:
determining that a service processor is not performing correctly; and
causing the service processor to reset such that the service processor returns to a monitoring mode without performing initial tests of a data processing system, wherein the data processing system remains active and is not shut down during the reset of the service processor;
determining, prior to causing a reset of the service processor, whether a condition exists that preempt the host from causing a reset of the service processor; and
responsive to an indication that the condition exists, refraining from causing a reset of the service processor;
wherein the condition is any of (i) that the service processor is in a debug mode, (ii) that the service processor is handling a critical event, and (iii) that the service processor is attempting to recover from a self detected error.

11. A computer program product in a computer readable media for use in a data processing system for reestablishing communications between a host and a service processor, the computer program product comprising:
instructions for initiating a monitoring mode to monitor the host by the service processor;
first instructions for determining that the service processor is not performing correctly; and
second instructions for causing the service processor to reset such that the service processor returns to the monitoring mode to which it was operating prior to the reset without performing initial tests of the data processing system; wherein the data processing system remains active and is not shut down during the reset of the service processor.

12. The computer program product as recited in claim 11, further comprising:
third instructions for sending a warning signal to the service processor, prior to causing a reset of the service processor, indicating that a hard reset will be attempted and waiting an interval of time between sending the warning signal and causing the reset.

13. The computer program product as recited in claim 11, further comprising:
third instructions for determining, prior to causing a reset of the service processor, whether a condition exists that preempt the host from causing a reset of the service processor; and
fourth instructions, responsive to an indication that the condition exists, for refraining from causing a hard reset of the service processor.

14. The computer program product as recited in claim 13, wherein the step of determining whether a condition exists that preempts the host from causing a reset of the service processor comprises consulting a status register.

15. The computer program product as recited in claim 11, wherein the step of causing a reset comprises changing a bit in a control register.

16. The computer program product as recited in claim 11, further comprising:
third instructions for sending a signal to the host system indicating that a self error recovery by the service processor is in progress.

17. The computer program product as recited in claim 16, further comprising:
fourth instructions for determining, prior to completing a self error recovery and recovering communications to the host system, whether the service processor has exceeded a predetermined maximum number of reset/reload attempts within a predetermined amount of time.

18. The computer program product as recited in claim 17, further comprising:
fifth instructions for incrementing a count, wherein the count indicates the number of times that the service processor has reset itself in a predetermined amount of time.

19. The computer program product as recited in claim 16, further comprising:
fourth instructions for clearing the signal to the host system indicating that the service processor self error recovery is complete.

20. A computer program product in a computer readable media for use in a data processing system for reestablishing communications between a host and a service processor, the computer program product comprising:

first instructions for determining that a service processor is not peforming correctly;

second instructions for causing the service processor to reset such that the service processor returns to a monitoring mode without performing initial tests of a data processing system, wherein the data processing system remains active and is not shut down during the reset of the service processor;

third instructions for determining, prior to causing a reset of the service processor, whether a condition exists that preempt the host from causing a reset of the service processor; and fourth instructions, responsive to an indication that the condition exists, for refraining from causing a reset of the service processor;

wherein the condition is any of (i) that the service processor is in a debug mode; (ii) that the service processor is handling a critical event, and (iii) that the service processor is attempting to recover from a self detected error.

21. A system for reestablishing communications between a host and a service processor, the system comprising:

means for initiating a monitoring mode to monitor the host by the service processor;

first means for determining that the service processor is not performing correctly; and second means for causing the service processor to reset such that the service processor returns to the monitoring mode to which it was operating prior to the reset without performing initial tests of a data processing system; wherein the data processing system remains active and is not shut down during the reset of the service processor.

22. The system as recited in claim 21, further comprising:

third means for sending a warning signal to the service processor, prior to causing a reset of the service processor, indicating that a hard reset will be attempted and waiting an interval of time between sending the warning signal and causing the reset.

23. The system as recited in claim 21, further comprising:

third means for determining, prior to causing a reset of the service processor, whether a condition exists that preempt the host from causing a reset of the service processor; and fourth means, responsive to an indication that the condition exists, for refraining from causing a reset of the service processor.

24. The system as recited in claim 23, wherein the step of determining whether a condition exists that preempts the host from causing a reset of the service processor comprises consulting a status register.

25. The system as recited in claim 21, wherein the step of causing a reset comprises changing a bit in a control register.

26. The system as recited in claim 21, further comprising:

third means for sending a signal to the host system indicating that a self error recovery by the service processor is in progress.

27. The system as recited in claim 26, further comprising:

fourth means for determining, prior to completing a self error recovery and recovering communications to the host system, whether the service processor has exceeded a predetermined maximum number of reset/reload attempts within a predetermined amount of time.

28. The system as recited in claim 27, further comprising:

fifth means for incrementing a count, wherein the count indicates the number of times that the service processor has reset itself in a predetermined amount of time.

29. The system as recited in claim 26, further comprising:

fourth means for clearing the signal to the host system indicating that the service processor self error recovery is complete.

30. A system for reestablishing communications between a host and a service processor, the system comprising:

first means for determining that a service processor is not performing correctly;

second means for causing the service processor to reset such that the service processor returns to the monitoring mode without performing initial tests of a data processing system, wherein the data processing system remains active and is not shut down during the reset of the service processor;

third means for determining, prior to causing a reset of the service proccessor, whether a condition exists that preempt the host from causing a reset of the service processor; and fourth means, responsive to an indication that the condition exists, for refraining from causing a reset of the service processor;

wherein the condition is any of (i) that the service processor is in a debug mode, (ii) that the service processor is handling a critical event, and (iii) that the service processor is attempting to recover from a self detected error.

\* \* \* \* \*

UNITED STATES PATENT AND TRADEMARK OFFICE
CERTIFICATE OF CORRECTION

PATENT NO. : 6,742,139 B1 Page 1 of 1
DATED : May 25, 2004
INVENTOR(S) : Forsman et al.

It is certified that error appears in the above-identified patent and that said Letters Patent is hereby corrected as shown below:

Column 9,
Line 4, after "not" delete "performing" and insert -- performing --.

Signed and Sealed this

Thirteenth Day of September, 2005

JON W. DUDAS
*Director of the United States Patent and Trademark Office*